United States Patent
Nguyen et al.

(10) Patent No.: US 10,429,994 B2
(45) Date of Patent: Oct. 1, 2019

(54) POSITION DETECTION DEVICE, POSITION DETECTION SYSTEM, AND POSITION DETECTION METHOD

(71) Applicant: SEIKO EPSON CORPORATION, Tokyo (JP)

(72) Inventors: Hieu Nguyen, Narvik (NO); Tormod Njolstad, Trondheim (NO); Babak Moussakhani, Trondheim (NO); Karol Marcin Pawlak, Trondheim (NO); Kenji Tanaka, Trondheim (NO); Shinji Kubota, Ina (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 15/110,297

(22) PCT Filed: Jan. 20, 2015

(86) PCT No.: PCT/JP2015/000238
§ 371 (c)(1),
(2) Date: Jul. 7, 2016

(87) PCT Pub. No.: WO2015/111402
PCT Pub. Date: Jul. 30, 2015

(65) Prior Publication Data
US 2016/0328089 A1     Nov. 10, 2016

(30) Foreign Application Priority Data

Jan. 21, 2014 (JP) .................................. 2014-008636
Mar. 25, 2014 (JP) .................................. 2014-062267

(51) Int. Cl.
*G06F 3/041* (2006.01)
*G06F 3/042* (2006.01)
(Continued)

(52) U.S. Cl.
CPC ............ *G06F 3/0425* (2013.01); *G06F 3/038* (2013.01); *G06F 3/0346* (2013.01);
(Continued)

(58) Field of Classification Search
CPC .... G06F 3/0425; G06F 3/0346; G06F 3/0386; G06F 3/038; G06F 3/0416; G06F 3/042
See application file for complete search history.

(56) References Cited

U.S. PATENT DOCUMENTS

2002/0021287 A1* 2/2002 Tomasi ................. G06F 1/1613
345/168
2003/0234346 A1 12/2003 Kao
(Continued)

FOREIGN PATENT DOCUMENTS

JP   2011-227600 A   11/2011
JP   2011-253255 A   12/2011
(Continued)

OTHER PUBLICATIONS

Feb. 24, 2015 Search Report issued in International Patent Application No. PCT/JP2015/000238.
(Continued)

*Primary Examiner* — Jonathan A Boyd
(74) *Attorney, Agent, or Firm* — Oliff PLC

(57) ABSTRACT

A projector includes an imaging unit which images a screen SC, and a position detection unit which detects an indication position of an indicator based on a captured image of the imaging unit. The position detection unit detects reflected light of detection light reflected by the indicator from the captured image of the imaging unit and obtains the indication position of the indicator based on the position of the reflected light detected from the captured image and the distance between the screen SC and the imaging unit.

11 Claims, 9 Drawing Sheets

(51) Int. Cl.
*G06F 3/0346* (2013.01)
*G06F 3/038* (2013.01)

(52) U.S. Cl.
CPC ............ *G06F 3/0386* (2013.01); *G06F 3/042* (2013.01); *G06F 3/0416* (2013.01)

(56) References Cited

U.S. PATENT DOCUMENTS

| | | |
|---|---|---|
| 2011/0043826 A1 | 2/2011 | Kiyose |
| 2013/0135260 A1* | 5/2013 | Damhaug ............ G06F 3/0304 345/175 |
| 2013/0314380 A1 | 11/2013 | Kuribayashi |

FOREIGN PATENT DOCUMENTS

| | | |
|---|---|---|
| JP | 2012-150635 A | 8/2012 |
| KR | 2014-0003448 A | 1/2014 |
| WO | 02/021502 A1 | 3/2002 |
| WO | 2012/070950 A1 | 5/2012 |

OTHER PUBLICATIONS

Aug. 18, 2017 Extended Search Report issued in European Patent Application No. 15740024.3.

* cited by examiner

POSITION DETECTION DEVICE, POSITION DETECTION SYSTEM, AND POSITION DETECTION METHOD

CROSS REFERENCE TO RELATED APPLICATIONS

The entire disclosure of Japanese Patent Application No. 2014-062267, filed Mar. 25, 2014 is expressly incorporated by reference herein.

TECHNICAL FIELD

The present invention relates to a position detection device, a position detection system, and a position detection method.

BACKGROUND ART

In the related art, a device which detects a position operated by an indicator, such as a pen, is known (for example, see PTL 1). For example, the system described in PTL 1 detects the position of a light emitting pen as an indicator by imaging a projection surface.

CITATION LIST

Patent Literature

[PTL 1]
JP-A-2011-227600

SUMMARY OF INVENTION

Technical Problem

In PTL 1, the image of light of the light emitting pen is detected from the captured image, thereby accurately detecting the indication position. This is because light of the light emitting pen matches the indication position. However, for example, when position detection is performed using reflected light reflected by an indicator, or the like, the position on an operation surface actually indicated by an indicator may not be shown in a captured image. In this case, it is difficult to accurately detect the indication position.

The invention has been made in view of the circumstances described above, and an object of the invention is to allow the indication position of an indicator on an operation surface to be accurately detected using a captured image.

Solution to Problem

In order to achieve the object described above, a position detection device according to the invention includes an imaging unit which images an operation surface, and a detection unit which detects an indication position of an indicator based on a captured image of the imaging unit, and is characterized in that the detection unit detects reflected light of detection light reflected by the indicator from the captured image of the imaging unit and obtains the indication position of the indicator based on the position of the reflected light detected from the captured image and the distance between the operation surface and the imaging unit.

According to the invention, it is possible to correct and obtain the indication position detected from the captured image based on the positional relationship between the imaging unit and the operation surface. With this, for example, even when the position detected by the captured image does not match the indication position of the indicator by the positional relationship between the reflection position of detection light in the indicator and the operation surface, it is possible to more accurately detect the indication position of the indicator on the operation surface.

In addition, the invention is characterized in that, in the position detection device described above, the device further includes an arithmetic unit which obtains the distance between the operation surface and a reflection position of the indicator in a direction perpendicular to the operation surface based on the distance between the operation surface and a reference position of the imaging unit in the direction perpendicular to the operation surface.

According to the invention, it is possible to obtain the position indicated on the operation surface based on reflected light reflected at a position separated from the operation surface.

In addition, the invention is characterized in that, in the position detection device described above, the device further includes a storage unit which stores distance data representing the distance between the operation surface and the reflection position of the indicator in the direction perpendicular to the operation surface obtained by the arithmetic unit, and that the detection unit obtains the indication position of the indicator based on the distance data stored in the storage unit. According to the invention, the use of the distance data stored in the storage unit eliminates a need for obtaining the distance each time position detection is performed and allows the indication position on the operation surface to be detected quickly.

In addition, the invention is characterized in that, in the position detection device described above, the device is configured as a projector including a projection unit which projects an image onto the operation surface, and that the projection range of the projection unit is imaged by the imaging unit.

According to the invention, it is possible to detect the indication position corresponding to an operation on the operation surface onto which the projector projects an image.

In addition, the invention is characterized in that, in the position detection device described above, the device further includes a calibration control unit which executes calibration to associate the position in the captured image of the imaging unit with the position in an image projected by the projection unit, and that the arithmetic unit generates the distance data based on the result of the calibration executed by the calibration control unit.

According to the invention, it is possible to generate the distance data between the operation surface and the reflection position of the indicator by executing the calibration. With this, after the calibration is executed, it is possible to accurately detect the indication position and to obtain the detected indication position as a position in a projection image.

In addition, the invention is characterized in that, in the position detection device described above, the device further includes a distance measurement unit which obtains the distance between the operation surface and the reference position of the imaging unit in the direction perpendicular to the operation surface.

According to the invention, since it is possible to measure the distance between the operation surface and the reference position of the imaging unit, it is possible to more accurately obtain the indication position.

In addition, the invention is characterized in that, in the position detection device described above, the device further includes a light emission unit which emits the detection light along the operation surface.

According to the aspect of the invention with this configuration, detection light is emitted from the position detection device, and the detection light is reflected by the indicator, whereby it is possible to detect the indication position of the indicator with no light emission function or the like.

In addition, in order to achieve the object described above, a position detection system according to the invention includes a light emission device which emits detection light along an operation surface to be operated by an indicator, and a position detection device which detects an indication position of the indicator. The position detection system is characterized in that the position detection device includes an imaging unit which images the operation surface, and a detection unit which detects the indication position of the indicator based on a captured image of the imaging unit, and that the detection unit detects reflected light of detection light reflected by the indicator from the captured image of the imaging unit, and obtains the indication position of the indicator based on the position of the reflected light detected from the captured image and the distance between the operation surface and the imaging unit.

According to the invention, it is possible to correct and obtain the indication position detected from the captured image based on the positional relationship between the imaging unit and the operation surface. With this, for example, even when the position detected by the captured image does not match the indication position of the indicator by the positional relationship between the reflection position of detection light in the indicator and the operation surface, it is possible to more accurately detect the indication position of the indicator on the operation surface.

In addition, in order to achieve the object described above, a position detection method according to the invention is directed to a position detection method which detects a position indicated by an indicator on an operation surface. The method is characterized in that the method includes imaging the operation surface, and detecting reflected light of detection light reflected by the indicator from a captured image and obtaining the indication position of the indicator based on the position of the reflected light detected from the captured image and the distance between the operation surface and an imaging position.

According to the invention, it is possible to correct and obtain the indication position detected from the captured image based on the positional relationship between the imaging unit and the operation surface. With this, for example, even when the position detected by the captured image does not match the indication position of the indicator by the positional relationship between the reflection position of detection light in the indicator and the operation surface, it is possible to more accurately detect the indication position of the indicator on the operation surface.

Advantageous Effects of Invention

According to the invention, it is possible to correct and obtain the indication position detected from the captured image based on the positional relationship between the imaging unit and the operation surface, and to more accurately detect the indication position based on the captured image.

DESCRIPTION OF EMBODIMENTS

Figure 1:
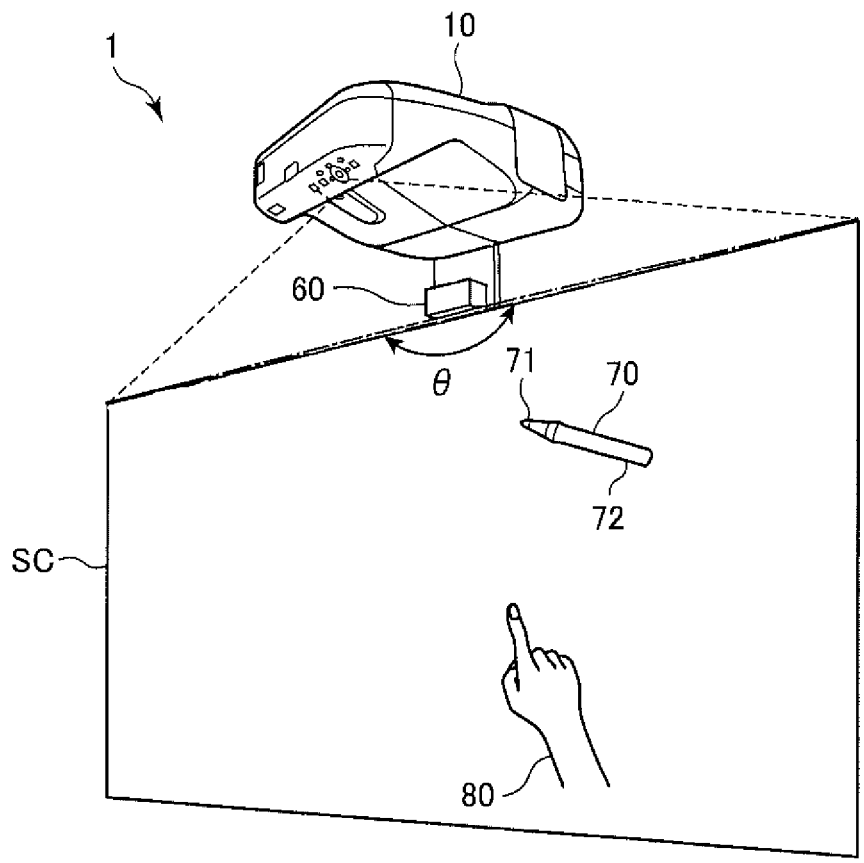
FIG. 1 is a schematic configuration diagram of a projection system according to an embodiment.

Hereinafter, an embodiment of the invention will be described referring to the drawings.

FIG. 1 is a diagram showing the configuration of a projection system 1 (position detection system) according to an embodiment to which the invention is applied. The projection system 1 includes a projector 10 (position detection device) which is provided above a screen SC (projection surface, operation surface), and a light emission device 60 (light emission unit) which is provided in the upper portion of the screen SC.

The projector 10 is provided directly above or obliquely above the screen SC, and projects an image toward the obliquely downside screen SC. In addition, the screen SC illustrated in this embodiment is a flat plate or a curtain which is fixed to a wall surface or is erected on a floor surface. The invention is not limited to this example, and the wall surface may be used as the screen SC. In this case, the projector 10 and the light emission device 60 may be attached to the upper portion of the wall surface which is used as the screen SC.

The projector 10 is connected to an external image supply device, such as a personal computer (PC), a video reproduction device, or a DVD reproduction device, and projects an image onto the screen SC based on an analog image signal or digital image data supplied from the image supply device. In addition, the projector 10 may be configured to read image data stored in an internal storage unit 110 (FIG. 2) or an externally connected storage medium and to display an image on the screen SC based on the image data.

The light emission device 60 has a light source unit 61 (FIG. 2) which has a solid-state light source, and spreads and emits (irradiates) light emitted from the light source unit 61 along the screen SC. The emission range of the light emission device 60 is represented by an angle θ in FIG. 1. The light emission device 60 is provided above the upper end of the screen SC to emit light downward in the range of the angle θ, and the light forms a layer of light along the screen SC. In this embodiment, the angle θ substantially reaches 180 degrees, and the layer of light is substantially formed over the entire screen SC. It is preferable that the surface of the screen SC is close to the layer of light, and in this embodiment, the distance between the surface of the screen SC and the layer of light is substantially in a range of 10 mm to 1 mm.

Light emitted from the light emission device 60 is light outside a visible region, and in this embodiment, is infrared light.

When an indication operation is performed on the screen SC, the projection system 1 detects an indication position by the projector 10.

Figure 2:
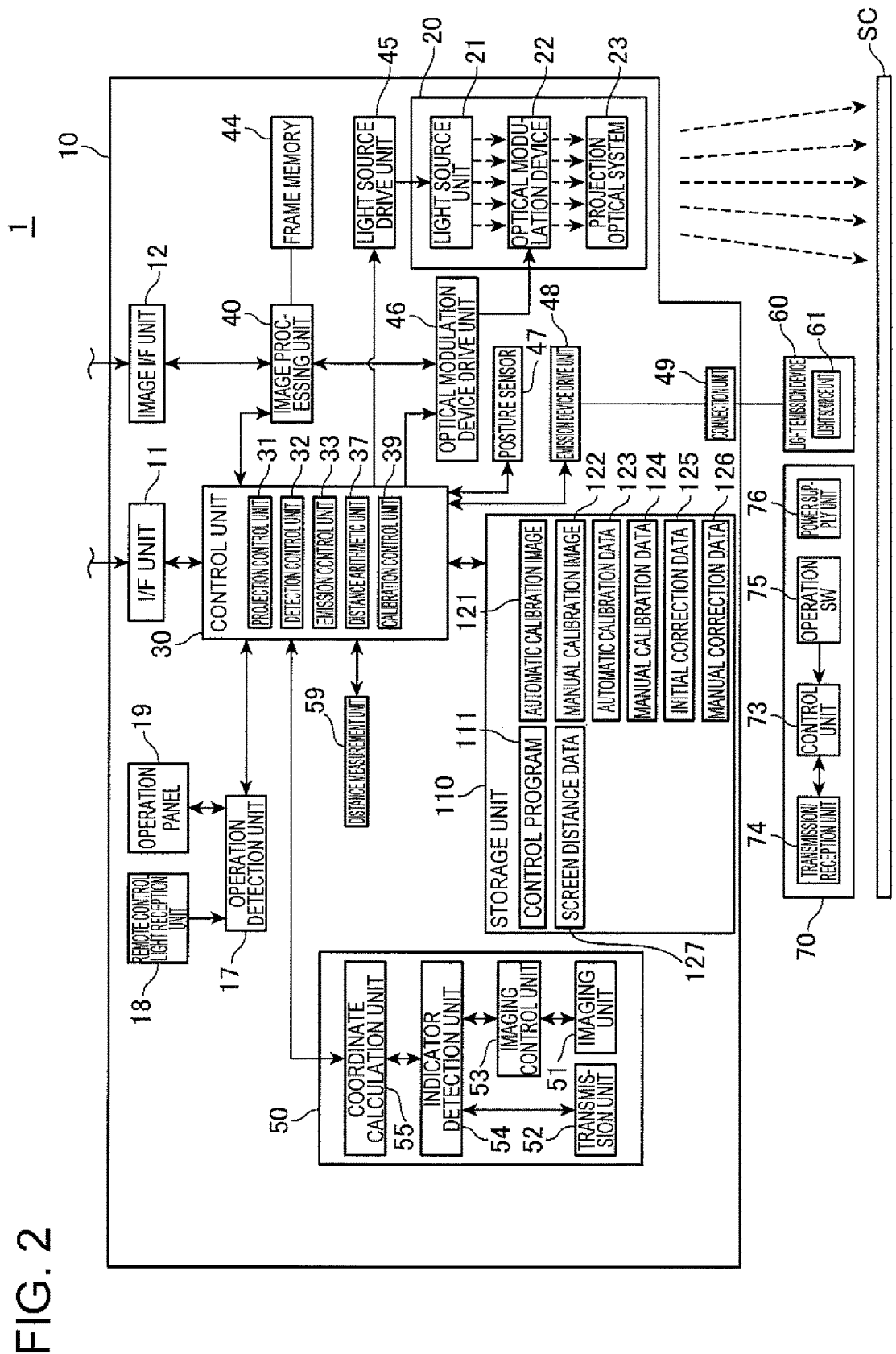
FIG. 2 is a functional block diagram of the projection system.

As an indicator which is used for an indication operation, a pen-type indicator 70 may be used. A tip portion 71 of the indicator 70 is equipped with an operation switch 75 (FIG. 2) which is operated when pressed, and if an operation to press the tip portion 71 against the wall or the screen SC is performed, the operation switch 75 is turned on. The indicator 70 is operated such that a user holds a rod-shaped shaft portion 72 in his/her hand and brings the tip portion 71 into contact with the screen SC, and an operation to press the tip portion 71 against the screen SC is also performed. The tip portion 71 is provided with a transmission/reception unit 74 which emits light (FIG. 2). The projector 10 detects the position of the tip portion 71 based on light emitted from the indicator 70 as an indication position. Light emitted from the indicator 70 is light outside the visible region, and in this embodiment, is infrared light.

In addition, when a position indication operation is performed by an indicator 80 which is the finger of the user, the user brings the finger into contact with the screen SC. In this case, the position where the indicator 80 is brought into contact with the screen SC is detected.

That is, when the tip (for example, fingertip) of the indicator 80 is brought into contact with the screen SC, the layer of light formed by the light emission device 60 is blocked. At this time, light emitted from the light emission device 60 hits the indicator 80 and is reflected, and part of reflected light travels from the indicator 80 toward the projector 10. The projector 10 has a function of detecting light from the screen SC side, that is, light from below by a position detection unit 50 described below, and thus can detect reflected light of the indicator 80. The projector 10 detects reflected light reflected by the indicator 80, thereby detecting an indication operation on the screen SC by the indicator 80. Further, the projector 10 detects an indication position indicated by the indicator 80.

Since the layer of light emitted from the light emission device 60 is close to the screen SC, the reflection position of light in the indicator 80 can be regarded as a tip closest to the screen SC or as an indication position. For this reason, it is possible to specify the indication position based on reflected light of the indicator 80.

The projection system 1 functions as an interactive white board system, detects an indication operation of the user using the indicator 70 or 80, and reflects the indication position in a projection image.

Specifically, the projection system 1 performs processing for drawing a figure or arranging a character or a symbol at an indication position, processing for drawing a figure along the locus of the indication position, processing for erasing a drawn figure or an arranged character or symbol, and the like. In addition, a figure drawn on the screen SC or a character or a symbol arranged on the screen SC may be stored as image data or may be output to an external device.

Further, the projection system 1 may be operated as a pointing device by detecting the indication position, and may output the coordinate of the indication position in an image projection region where the projector 10 projects an image onto the screen SC. In addition, a graphical user interface (GUI) operation may be performed using the coordinate.

FIG. 2 is a functional block diagram of the respective units of the projection system 1.

The projector 10 includes an interface (I/F) unit 11 and an image interface (I/F) unit 12 as an interface which is connected to an external device. The I/F unit 11 and the image I/F unit 12 may include connectors for wired connection, and may include interface circuits corresponding to the connectors. In addition, the I/F unit 11 and the image I/F unit 12 may include interfaces for wireless communication. As the connectors for wired connection and the interface circuits, those based on wired LAN, IEEE1394, USB, and the like are considered. Further, as the wireless communication interfaces, those based on wireless LAN, Bluetooth (Registered Trademark), and the like are considered. As the image I/F unit 12, an interface for image data, such as an HDMI (Registered Trademark) interface, may be used. The image I/F unit 12 may include an interface to which sound data is input.

The I/F unit 11 is an interface which transmits and receives various kinds of data to and from an external device, such as a PC. The I/F unit 11 inputs and outputs control data relating to projection of an image, setting data for setting the operation of the projector 10, coordinate data of the indication position detected by the projector 10, and the like. A control unit 30 described below has a function of transmitting and receiving data to and from an external device through the I/F unit 11.

The image I/F unit 12 is an interface to which digital image data is input. The projector 10 of this embodiment projects an image based on digital image data input through the image I/F unit 12. It should be noted that the projector 10 may include a function of projecting an image based on an analog image signal, and in this case, the image I/F unit 12 may include an interface for an analog image, and an A/D conversion circuit which converts an analog image signal to digital image data.

The projector 10 includes a projection unit 20 which forms an optical image. The projection unit 20 has a light source unit 21, an optical modulation device 22, and a projection optical system 23. The light source unit 21 includes a light source which has a xenon lamp, an ultra-high pressure mercury lamp, a light emitting diode (LED), a laser light source, or the like. In addition, the light source unit 21 may include a reflector and an auxiliary reflector which guide light emitted from the light source to the optical modulation device 22. The light source unit 21 may further include a lens group (not shown) which increases optical characteristics of projection light, a polarizing plate, a dimmer element which reduces the quantity of light emitted from the light source on a path to the optical modulation device 22, and the like.

The optical modulation device 22 includes, for example, three transmissive liquid crystal panels corresponding to three primary colors of RGB, and modulates light transmitted through the liquid crystal panels to generate image light. Light from the light source unit 21 is separated into color light components of three colors of RGB, and the color light components are respectively input to the corresponding liquid crystal panels. The color light components modulated through the liquid crystal panels are synthesized by a synthesis optical system, such as a cross dichroic prism, and are emitted to the projection optical system 23.

The projection optical system 23 includes a lens group which guides image light modulated by the optical modulation device 22 toward the screen SC and forms an image on the screen SC. In addition, the projection optical system 23 may include a zoom mechanism which enlarges and reduces a projection image of the screen SC and performs focal point adjustment, or a focus adjustment mechanism which performs focus adjustment. When the projector 10 is a short focus type, a concave mirror which reflects image light toward the screen SC may be provided in the projection optical system 23.

A light source drive unit 45 which turns on the light source unit 21 under the control of the control unit 30, and an optical modulation device drive unit 46 which operates the optical modulation device 22 under the control of the control unit 30 are connected to the projection unit 20. The light source drive unit 45 may have a function of switching between on and off of the light source unit 21 and adjusting the quantity of light of the light source unit 21.

The projector 10 includes an image processing system which processes an image projected by the projection unit 20. The image processing system includes the control unit 30 which controls the projector 10, a storage unit 110, an operation detection unit 17, an image processing unit 40, a light source drive unit 45, and the optical modulation device drive unit 46. In addition, a frame memory 44 is connected to the image processing unit 40, and a posture sensor 47, an emission device drive unit 48, and the position detection unit 50 are connected to the control unit 30. The respective units may be included in the image processing system.

The control unit 30 executes a predetermined control program 111 to control the respective units of the projector 10. The storage unit 110 stores, in a nonvolatile manner, the control program 111 which is executed by the control unit 30 and data which is processed by the control unit 30. The storage unit 110 stores setting screen data 112 of a screen for setting the operation of the projector 10 and setting data 113 representing the contents set using setting screen data 112.

The image processing unit 40 processes image data input through the image I/F unit 12 under the control of the control unit 30 and outputs an image signal to the optical modulation device drive unit 46. Processing which is executed by the image processing unit 40 includes discrimination processing between a 3D (stereoscopic) image and a 2D (plane) image, resolution conversion processing, frame rate conversion processing, distortion correction processing, digital zoom processing, color tone correction processing, luminance correction processing, and the like. The image processing unit 40 executes processing designated by the control unit 30 and performs processing using parameters input from the control unit 30 as necessary. In addition, of course, a plurality of kinds of processing among the above-described processing may be executed in combination.

The image processing unit 40 is connected to the frame memory 44. The image processing unit 40 expands image data input from the image input I/F 12 to the frame memory 44 and executes various kinds of processing described above on expanded image data. The image processing unit 40 reads image data after processing from the frame memory 44, generates image signals of R, G, and B corresponding to the image data, and outputs the image signals to the optical modulation device drive unit 46.

The optical modulation device drive unit 46 is connected to the liquid crystal panels of the optical modulation device 22. The optical modulation device drive unit 46 drives the liquid crystal panels based on an image signal input from the image processing unit 40 and draws an image on each liquid crystal panel.

The operation detection unit 17 is connected to a remote control light reception unit 18 and an operation panel 19 which function as an input device, and detects an operation through the remote control light reception unit 18 and the operation panel 19. The remote control light reception unit 18 receives an infrared signal transmitted corresponding to a button operation from a remote control (not shown) which is used by the user of the projector 10 by the remote control light reception unit 18.

The remote control light reception unit 18 decodes the infrared signal received from the remote control, generates operation data representing the operation content in the remote control, and outputs operation data to the control unit 30.

The operation panel 19 is provided in an exterior housing of the projector 10, and has various switches and an indicator lamp. The operation detection unit 17 appropriately turns on and off the indicator lamp of the operation panel 19 according to the operation state or setting state of the projector 10 under the control of the control unit 30. If a switch of the operation panel 19 is operated, operation data corresponding to the operated switch is output from the operation detection unit 17 to the control unit 30.

The emission device drive unit 48 is connected to the light emission device 60 through a connection unit 49. The connection unit 49 is, for example, a connector having a plurality of pins, and the light emission device 60 is connected to the connection unit 49 through a cable 60a. The emission device drive unit 48 generates a pulse signal under the control of the control unit 30 and outputs the pulse signal to the light emission device 60 through the connection unit 49. In addition, the emission device drive unit 48 supplies power to the light emission device 60 through the connection unit 49.

As shown in FIG. 1, the light emission device 60 is configured such that the light source unit 61 and optical components are housed in a boxlike case. The light emission device 60 of this embodiment includes a solid-state light source 62 which emits infrared light in the light source unit 61. Infrared light emitted from the solid-state light source 62 is diffused by a collimating lens and a Powell lens, and forms a surface along the screen SC. In addition, the light source unit 61 may include a plurality of solid-state light sources, and may diffuse light emitted from each of a plurality of solid-state light sources to form the layer of light to cover the image projection range of the screen SC. Further, the light emission device 60 may include an adjustment mechanism which adjusts the distance or angle between the layer of light emitted from the light source unit 61 and the screen SC. The light emission device 60 turns on the light source unit 61 by the pulse signal and power supplied from the emission device drive unit 48. The timing at which the light source unit 61 is turned on and off is controlled by the emission device drive unit 48. The control unit 30 controls the emission device drive unit 48 to turn on the light source unit 61 in synchronization with the timing at which, an imaging unit 51 described below performs imaging.

The position detection unit 50 (detection unit) detects an operation on the screen SC by the indicator 70 or 80. The position detection unit 50 includes the imaging unit 51, a transmission unit 52, an imaging control unit 53, an indicator detection unit 54, and a coordinate calculation unit 55.

The imaging unit 51 has an imaging optical system, an imaging element, an interface circuit, and the like, and images the projection direction of the projection optical system 23. The imaging optical system of the imaging unit 51 is substantially arranged toward the same direction as the projection optical system 23, and has an image angle including a range (projection range) in which the projection optical system 23 projects an image onto the screen SC. In addition, as the imaging element, a CCD or a CMOS which receives light in an infrared region and a visible region is considered. The imaging unit 51 may include a filter which blocks part of light incident on the imaging element, and for example, when infrared light is received, a filter which primarily transmits light in an infrared region may be arranged in front of the imaging element. Further, the interface circuit of the imaging unit 51 reads and outputs a detection value of the imaging element.

The imaging control unit 53 causes the imaging unit 51 to execute imaging to generate captured image data. If the imaging element performs imaging by visible light, an image projected onto the screen SC is imaged. For example, an automatic calibration image described below is imaged by visible light. In addition, as described above, the imaging control unit 53 causes the imaging unit 51 to image infrared light. A captured image in this case shows infrared light (infrared signal) emitted from the indicator 70 or reflected light reflected by the indicator 80.

The indicator detection unit 54 detects the indication position of the indicator 70 or 80 based on captured image data imaged by the imaging control unit 53. The indicator detection unit 54 detects the image of infrared light emitted from the indicator 70 and/or the image of reflected light reflected by the indicator 80 from captured image data when the imaging control unit 53 causes the imaging unit 51 to image infrared light. Further, the indicator detection unit 54 may perform determination about whether the detected image is the image of light emitted from the indicator 70 or the image of reflected light of the indicator 80.

The coordinate calculation unit 55 calculates the coordinate of the indication position of the indicator 70 or 80 in captured image data based on the position of the image detected by the indicator detection unit 54 and outputs the coordinate to the control unit 30. The coordinate calculation unit 55 may also calculate the coordinate of the indication position of the indicator 70 or 80 in a projection image projected by the projection unit 20 and may output the coordinate to the control unit 30. Further, the coordinate calculation unit 55 may calculate the coordinate of the indication position of the indicator 70 or 80 in image data drawn in the frame memory 44 by the image processing unit 40 or the coordinate of the indication position of the indicator 70 or 80 in input image data of the image I/F unit 12.

The transmission unit 52 transmits the infrared signal to the indicator 70 under the control of the indicator detection unit 54. The transmission unit 52 has a light source, such as an infrared LED, and turns on and off the light source under the control of the indicator detection unit 54.

In addition, the indicator 70 includes a control unit 73, a transmission/reception unit 74, an operation switch 75, and a power supply unit 76, and the respective units are housed in the shaft portion 72 (FIG. 1). The control unit 73 is connected to the transmission/reception unit 74 and the operation switch 75, and detects the on/off state of the operation switch 75. The transmission/reception unit 74 includes a light source, such as an infrared LED, and a light reception element which receives infrared light, turns on and off the light source under the control of the control unit 73, and outputs a signal representing the light reception state of the light reception element to the control unit 73.

The power supply unit 76 has a dry battery or a secondary battery as a power supply, and supplies power to the control unit 73, the transmission/reception unit 74, and the operation switch 75.

The indicator 70 may include a power switch which turns on and off power supply from the power supply unit 76.

Here, a method which specifies the indicator 70 from captured image data of the imaging unit 51 by mutual communication between the position detection unit 50 and the indicator 70 will be described.

The control unit 30 controls the indicator detection unit 54 to transmit a signal for synchronization from the transmission unit 52 when the position indication operation by the indicator 70 is detected. That is, the indicator detection unit 54 turns on the light source of the transmission unit 52 in a predetermined cycle under the control of the control unit 30. Infrared light cyclically emitted from the transmission unit 52 functions as a synchronization signal for synchronizing the position detection unit 50 and the indicator 70.

On the other hand, after the supply of power from the power supply unit 76 starts and a predetermined initialization operation is performed, the control unit 73 receives infrared light emitted from the transmission unit 52 of the projector 10 by the transmission/reception unit 74. If infrared light cyclically emitted from the transmission unit 52 is received by the transmission/reception unit 74, the control unit 73 causes the light source of the transmission/reception unit 74 to be turned on (to emit light) in a preset turn-on pattern in synchronization with the timing of infrared light. The turn-on pattern represents data unique to the indicator 70 by associating turn-on and turn-off of the light source with on and off of data. The control unit 73 turns on and off the light source according to the turn-on time and the turn-off time of the set pattern. The control unit 73 repeatedly executes the above-described pattern while power is supplied from the power supply unit 76.

That is, the position detection unit 50 cyclically transmits the infrared signal for synchronization to the indicator 70, and the indicator 70 transmits a preset infrared signal in synchronization with the infrared signal transmitted from the position detection unit 50.

The imaging control unit 53 of the position detection unit 50 performs control to match the imaging timing of the imaging unit 51 with the turn-on timing of the indicator 70. The imaging timing is determined based on the timing at which the indicator detection unit 54 turns on the transmission unit 52. The indicator detection unit 54 can specify the turn-on pattern of the indicator 70 based on whether or not the image of light of the indicator 70 is shown in captured image data of the imaging unit 51.

The turn-on pattern of the indicator 70 can include a unique pattern for each individual indicator 70 or a common pattern to a plurality of indicators 70 and a unique pattern for each individual. In this case, when images of infrared light emitted from a plurality of indicators 70 are included in captured image data, the indicator detection unit 54 can distinguish between the images as images of different indicators 70.

In addition, the control unit 30 controls the emission device drive unit 48 to synchronize the turn-on timing of the light source unit 61 with the imaging timing of the imaging unit 51. If the light source unit 61 is turned on in a pulsed manner according to the imaging timing of the imaging unit 51, when the indicator 80 performs an indication on the screen SC, reflected light of the indicator 80 is shown in the captured image of the imaging unit 51. If the light source unit 61 is turned on in a pattern capable of distinguishing from the turn-on timing of the indicator 70, the indicator detection unit 54 can perform determination about whether an image shown in captured image data is the indicator 70 or the indicator 80. The turn-on timing of the light source unit 61 will be described below referring to FIG. 8.

Further, the control unit 73 in the indicator 70 switches the turn-on pattern of the transmission/reception unit 74 according to the operation state of the operation switch 75. For this reason, the indicator detection unit 54 can perform determination about the operation state of the indicator 70 based on a plurality of pieces of captured image data, that is, whether or not the tip portion 71 is pressed against the screen SC.

The posture sensor 47 has an acceleration sensor, a gyro sensor, or the like, and outputs a detection value to the control unit 30. The posture sensor 47 is fixed to the main body of the projector 10 such that the installation direction of the projector 10 can be identified.

As shown in FIG. 1, the projector 10 can be used in an installation state in which projection is performed from below the screen SC, an installation state in which a horizontal surface, such as a top surface of a desk, is used as the screen SC, or the like, in addition to suspension installation of suspending the projector 10 from a wall surface or a ceiling. The installation state of the projector 10 may not be suitable for the use of the light emission device 60. For example, when projection is performed onto the screen SC from below, it is not appropriate that the body of the user blocks emission light of the light emission device 60. The posture sensor 47 is provided in the main body of the projector 10 such that a plurality of installation states assumed as the installation state of the projector 10 can be identified. The posture sensor 47 has, for example, a dual-axis gyro sensor, a single-axis gyro sensor, an acceleration sensor, or the like. The control unit 30 can automatically determine the installation state of the projector 10 based on an output value of the posture sensor 47. When the control unit 30 determines that the installation state is not suitable for the use of the light emission device 60, for example, the emission device drive unit 48 stops the output of a power supply voltage or a pulse signal.

The distance measurement unit 59 measures a distance L (FIG. 6) between a reference position of the imaging unit 51 and the screen SC. Several methods of the specific configuration of the distance measurement unit 59 and a method of measuring the distance L in the distance measurement unit 59 are considered. For example, a method which installs a cordless extension unit (not shown) for distance measurement at the wall or ceiling, to which the screen SC is attached, is considered. The cordless extension unit is constituted as a separate body from the projector 10. In this case, the distance measurement unit 59 has a configuration to transmit and receive an ultrasonic wave, laser light, a radio signal to and from the cordless extension unit, and includes, for example, a transmitter and a receiver, a light source and a light receiver, or a transceiver. In addition, similarly, the cordless extension unit has a configuration to transmit and receive an ultrasonic wave, laser light, or a radio signal to and from the distance measurement unit 59, and is, for example, a receiver and a transmitter, a mirror, or a transceiver. An ultrasonic wave, laser light, or a radio signal is transmitted and received between the distance measurement unit 59 provided in the main body of the projector 10 and the cordless extension unit, whereby it is possible to obtain the distance between the cordless extension unit and the distance measurement unit 59 and to obtain the distance L based on the obtained distance. In this case, a function or an offset quantity corresponding to the positional relationship between the cordless extension unit and the surface (operation surface) of the screen SC and the positional relationship between the distance measurement unit 59 and the reference position (described below) of the imaging unit 51, whereby it is possible to accurately calculate the distance L.

In addition, for example, the distance measurement unit 59 includes an extendable measurement tool, and the measurement tool is extended from the projector 10 to the screen SC side, thereby measuring the distance L. In this case, the distance measurement unit 59 includes an extendable tool, and a detector, such as a linear encoder or a rotary encoder, which detects the extension quantity of the tool. Further, a drive unit, such as a motor or an actuator, which extends and contracts the tool may be provided.

The distance measurement unit 59 executes a measurement operation under the control of the control unit 30 and outputs the result of the measurement operation to the control unit 30.

The control unit 30 reads and executes the control program 111 stored in the storage unit 110, realizes the functions of a projection control unit 31, a detection control unit 32, an emission control unit 33, a distance arithmetic unit 37 (arithmetic unit), and a calibration control unit 39, and controls the respective units of the projector 10.

The projection control unit 31 acquires the content of an operation performed by the user based on operation data input from the operation detection unit 17. The projection control unit 31 controls the image processing unit 40, the light source drive unit 45, and the optical modulation device drive unit 46 according to the operation performed by the user to cause an image to be projected onto the screen SC. The projection control unit 31 performs control such that the image processing unit 40 performs discrimination processing between a 3D (stereoscopic) image and a 2D (plane) image, resolution conversion processing, frame rate conversion processing, distortion correction processing, digital zoom processing, color tone correction processing, luminance correction processing, and the like. In addition, the projection control unit 31 controls the light source drive unit 45 and controls the light quantity of the light source unit 21 according to the processing of the image processing unit 40.

The detection control unit 32 performs controls such that the position detection unit 50 detects the operation position of the indicator 70 or 80, and acquires the coordinate of the operation position. In addition, the detection control unit 32 acquires data for identifying the operation position of the indicator 70 or the operation position of the indicator 80 and data representing the operation state of the operation switch 75, along with the coordinate of the operation position. The detection control unit 32 executes preset processing based on the acquired coordinate and data. For example, processing for drawing a figure based on the acquired coordinate and projecting the drawn figure to be superimposed on an input image input to the image I/F unit 12 is performed by the image processing unit 40. In addition, the detection control unit 32 may output the acquired coordinate to an external device, such as a PC, connected to the I/F unit 11. In this case, the detection control unit 32 may convert and output the acquired coordinate in a data format to be recognized as input of a coordinate input device in an operating system of the external device connected to the I/F unit 11. For example, when a PC which operates on a Windows (Registered Trademark) operating system is connected to the I/F unit 11, data which is processed as input data of a human interface device (HID) in the operating system is output. Further, the detection control unit 32 may output data for identifying the operation position of the indicator 70 or the operation position of the indicator 80 and data representing the operation state of the operation switch 75, along with data of the coordinate.

In addition, the detection control unit 32 controls position detection using the indicator 80. Specifically, the detection control unit 32 performs determination about whether or not the light emission device 60 can be used based on the presence/absence of connection of the light emission device 60. When the light emission device 60 cannot be used, the detection control unit 32 performs setting to disable the use of the light emission device 60. Here, the detection control unit 32 may report that the light emission device 60 cannot be used.

The emission control unit 33 performs control such that the emission device drive unit 48 executes or stops the output of the power and pulse signal to the light emission device 60 connected to the connection unit 49. When the light emission device 60 cannot be used or is not used, the emission control unit 33 stops the output of the power and pulse signal of the emission device drive unit 48 under the control of the detection control unit 32. In addition, when the light emission device 60 is used, the emission control unit 33 enables the output of the power and pulse signal of the emission device drive unit 48.

The distance arithmetic unit 37 calculates a distance $L_D$ described below from the result of manual calibration when the calibration control unit 39 executes manual calibration of the indicator 80 as described below. The content of arithmetic operation executed by the distance arithmetic unit 37 will be described below.

The calibration control unit 39 detects the indication position of the indicator 70 and the indicator 80 and executes calibration for converting the indication position to the coordinate in the input image of the image I/F unit 12.

The calibration is executed as one of initial settings when the projector 10 is used initially. The calibration is, for example, processing for associating a position in an image drawn in the frame memory 44 and projected by the projection unit 20 with a position on captured image data imaged by the imaging unit 51. The indication position of the indicator 70 or 80 detected from captured image data by the position detection unit 50 is the position in captured image data, and for example, is represented by a coordinate in a coordinate system set in the captured image. The user is aware of a projection image projected onto the screen SC and performs an indication by the indicator 70 or 80. Accordingly, the projector 10 should specify the indication position to the projection image on the screen SC. The calibration allows the coordinate of the detected position by captured image data to be converted to the coordinate on projection image data. Data which performs the association is referred to as calibration data. Calibration data is data which associates the coordinate on captured image data output from the imaging control unit 53 with the coordinate on the projection image. Specifically, calibration data may be a table in which the coordinate on captured image data is associated with the coordinate on the projection image one-to-one, or a function which converts the coordinate on captured image data to the coordinate on the projection image.

The calibration control unit 39 executes calibration according to the type of the indicator. That is, two types of calibration relating to the detection of the indication position of the indicator 70 and calibration of the detection of the indication position of the indicator 80 are executed.

The calibration control unit 39 can execute automatic calibration and manual calibration as calibration relating to the indication position of the indicator 70.

The automatic calibration is processing for projecting an image for automatic calibration onto the screen SC, performing imaging by the imaging unit 51, and generating calibration data using captured image data. The automatic calibration is processing which can be automatically executed by the projector 10, and the operation of the indicator 70 or 80 of the user is not required. The automatic calibration is not limited to a case where the user instructs execution by the remote control or the operation panel 19, and may be executed at the control timing of the control unit 30. For example, the automatic calibration may be performed at the time of the start of the operation, such as immediately after the power-on of the projector 10, or may be performed during a normal operation described below. An automatic calibration image 121 which is projected by the automatic calibration is stored in the storage unit 110 in advance.

Figure 3:
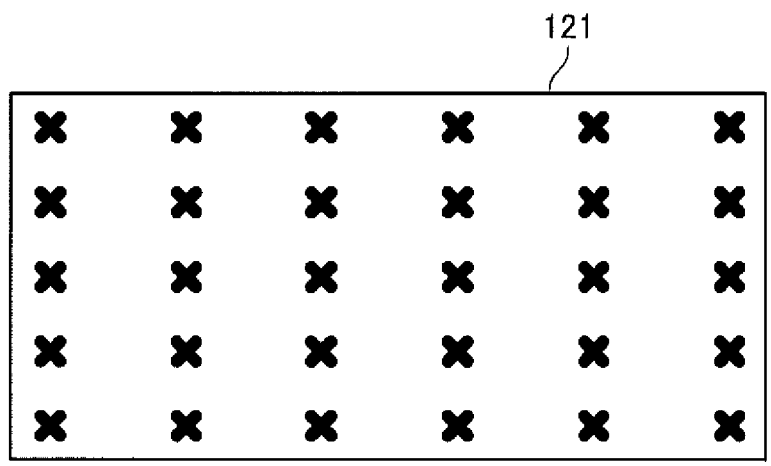
FIG. 3 is a diagram showing an example of an automatic calibration image.

FIG. 3 shows an example of the automatic calibration image 121. In the automatic calibration image 121, a plurality of marks are arranged at predetermined intervals.

Figure 4:
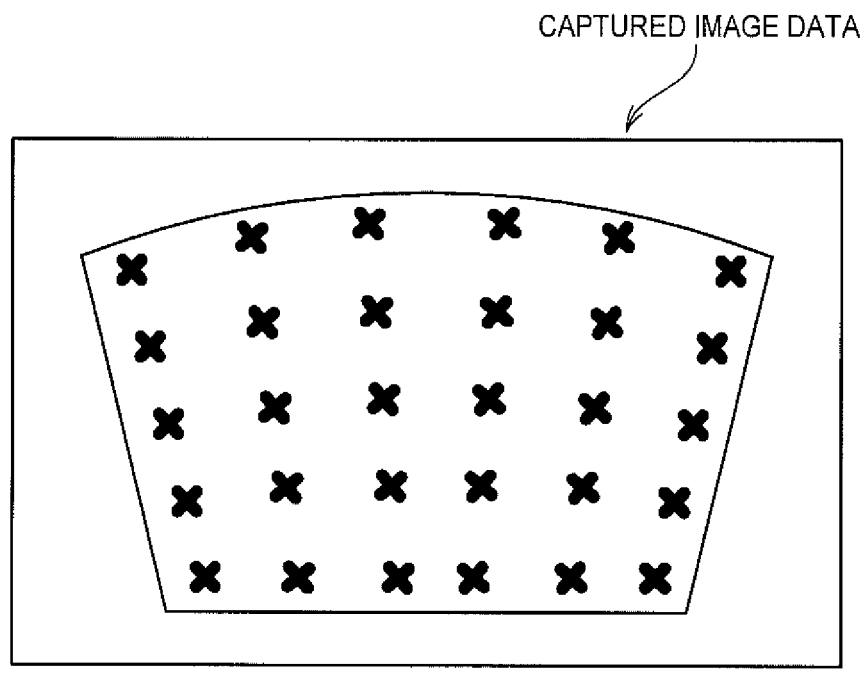
FIG. 4 is a diagram showing an example of captured image data obtained by imaging an automatic calibration image projected onto a screen.

FIG. 4 shows an example of captured image data obtained by imaging the automatic calibration image 121 projected onto the screen SC by the imaging unit 51. As shown in FIG. 1, when the projector 10 is suspended, captured image data of the imaging unit 51 is imaged from obliquely above the screen SC and thus becomes a distorted image. Although FIG. 3 illustrates the rectangular automatic calibration image 121 having the marks arranged at regular intervals, a distorted image is shown in captured image data of FIG. 4, and the interval between the marks arranged in the image is different depending on the positions of the marks.

The calibration control unit 39 operates the image processing unit 40 and the projection unit 20 based on the automatic calibration image 121 stored in the storage unit 110 by the function of the projection control unit 31 to project the automatic calibration image 121 onto the screen SC. The calibration control unit 39 controls the position detection unit 50 to cause the imaging unit 51 to execute imaging and acquires captured image data. Captured image data is temporarily stored in a memory (not shown) from the imaging control unit 53 and is output to the control unit 30. The calibration control unit 39 detects the marks from captured image data and acquires the gravity center position of each mark as the coordinate value of the mark. The calibration control unit 39 associates the marks detected from captured image data with the marks in the projection image drawn in the frame memory 44, that is, the automatic calibration image 121. The calibration control unit 39 associates with coordinate values of the marks in the captured image with the coordinate values of the marks in the projection image, thereby creating automatic calibration data 123 in a table format or a function format. The coordinate values in the projection image of the marks of the automatic calibration image 121 are stored in the storage unit 110 in advance along with the automatic calibration image 121 or to be included in the automatic calibration image 121. When automatic calibration data 123 is stored in advance, the calibration control unit 39 updates automatic calibration data 123.

The calibration control unit 39 executes single calibration to create or update single automatic calibration data 123. The calibration control unit 39 may use a plurality of automatic calibration images 121 by single automatic calibration. For example, a plurality of automatic calibration images 121 which are different in the arrangement state of the marks, such as the number of marks, the size of each mark, the shape of each mark, and the position of each mark, may be used. The calibration control unit 39 may associate a plurality of times of imaging with the coordinates using a plurality of automatic calibration images 121 and may integrate the obtained association results to create higher-accuracy automatic calibration data 123.

The manual calibration is processing for projecting an image for manual calibration onto the screen SC, detecting the operation of the indicator 70 corresponding to the projected image, and generating manual calibration data.

Figure 5:
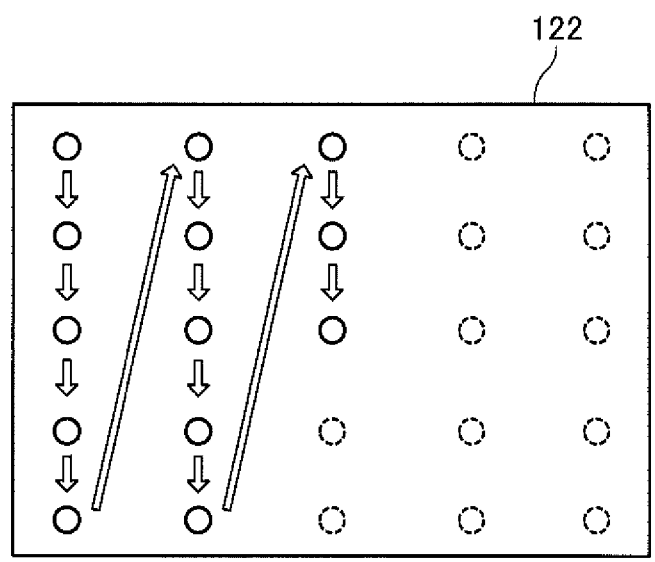
FIG. 5 is a diagram showing an example of a manual calibration image.

FIG. 5 shows an example of a manual calibration image 122. The manual calibration image 122 includes marks representing indication positions for causing the user to perform an indication by the indicator 70. The manual calibration image 122 of FIG. 5 has a plurality of marks (◯) for indication, and the user indicates the position of each mark by the indicator 70.

Although the manual calibration image 122 includes a plurality of marks, these marks are projected onto the screen SC one by one. For this reason, specifically, the manual calibration image 122 is constituted by a combination of a plurality of images which are different in the number of marks.

Each time a mark is displayed on the screen SC, the user indicates the newly displayed mark by the indicator 70. The calibration control unit 39 detects the indication position each time the user performs an operation. Then, the calibration control unit 39 associates the indication positions detected by the captured image with the marks of the projection image drawn in the frame memory 44, that is, the manual calibration image 122. The calibration control unit 39 associates the coordinate values of the indication positions detected by the captured image data with the coordinate values of the marks on the projection image, thereby creating manual calibration data 124.

Manual calibration data 124 may be in the same data format as automatic calibration data 123, or may be correction data which corrects automatic calibration data 123. Automatic calibration data 123 is data which converts the coordinate on the captured image to the coordinate on the projection image. In contrast, manual calibration data 124 is data which further corrects the coordinate after converted using automatic calibration data 123.

When performing the calibration relating to the detection of the indication position of the indicator 70, the calibration control unit 39 can execute automatic calibration or manual calibration. When the storage unit 110 stores automatic calibration data 123 previously generated, the automatic calibration and the manual calibration can be selectively executed. Here, when the automatic calibration is executed, the calibration control unit 39 updates automatic calibration data 123 of the storage unit 110. When the manual calibration is executed, manual calibration data 124 is generated or updated. In addition, when automatic calibration data 123 is not stored in the storage unit 110, it is necessary to execute the automatic calibration. This is because manual calibration data 124 cannot be used in a state where automatic calibration data 123 is not stored.

The calibration control unit 39 can execute the calibration relating to the detection of the indication position of the indicator 80 in the same manner as the manual calibration of the indicator 70. In the manual calibration relating to the indicator 80, data for correcting the indication position detected from captured image data of the position detection unit 50 to eliminate an error specific to the indicator 80 is acquired. This point will be described.

Figure 6:
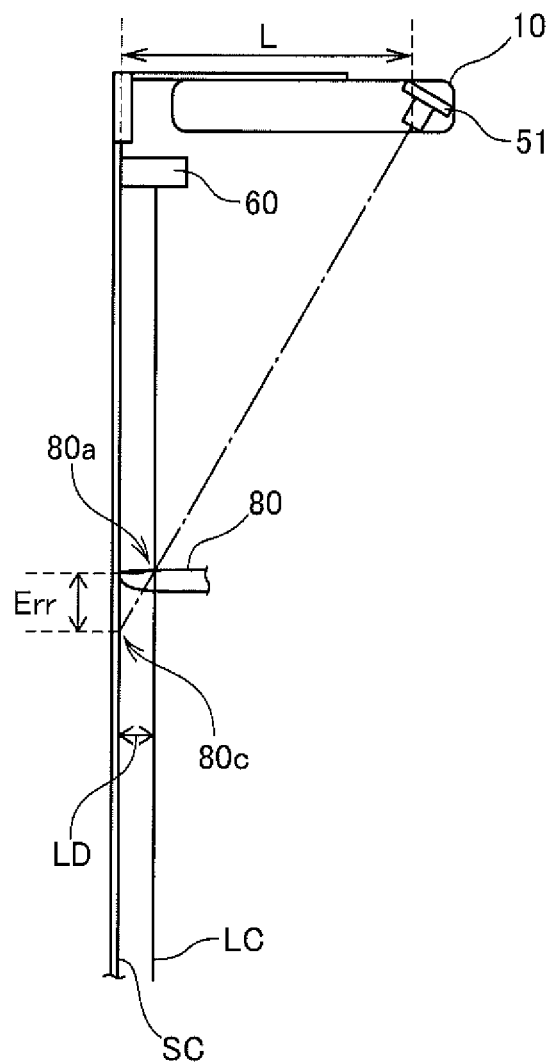
FIG. 6 is a side view showing a way of detecting an indication position.
Figure 7A:
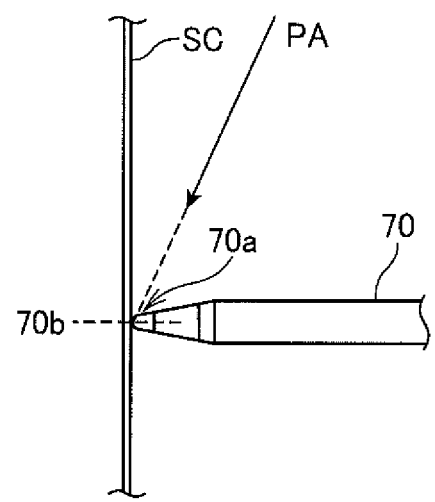
FIG. 7 is a main part enlarged views showing a way of detecting an indication position.
Figure 7B:
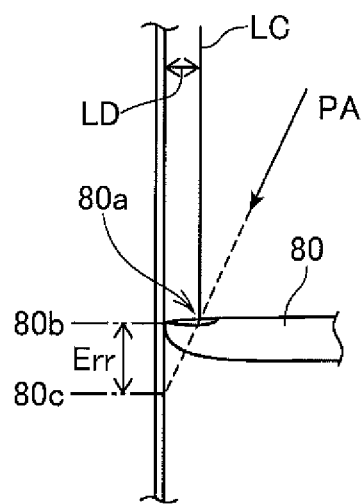

FIGS. 6 and 7 are explanatory views showing a way of detecting the indication position of the indicator 70 or 80. FIG. 6 is a side view of the projection system 1, and FIG. 7 is a main part enlarged view near the screen SC. FIG. 7(A) is an enlarged view showing a case where the indication position of the indicator 70 is detected, and FIG. 7(B) is an enlarged view showing a case where the indication position of the indicator 80 is detected.

As shown in FIG. 6, the projector 10 is provided above the screen SC, and the imaging unit 51 images the screen SC from a separated position in front of the screen SC as an overhead view. The imaging direction of the imaging unit 51 is represented by an arrow PA in FIGS. 7(A) and 7(B).

In the following description, the distance between the imaging unit 51 and the screen SC is referred to as a distance L. The distance L is the distance between the surface (operation surface) of the screen SC and the reference position of the imaging unit 51 in a direction perpendicular to the screen SC.

Here, although the reference position of the imaging unit 51 is set to the position of a lens of the imaging unit 51, the reference position of the imaging unit 51 may be a predetermined position in a lens group of the imaging unit 51 or may be a light reception surface of the imaging element.

In addition, detection light LC which is emitted from the light emission device 60 in the upper portion of the screen SC is substantially parallel to the surface of the screen SC and is separated from the screen SC by a predetermined distance (hereinafter, referred to as a distance $L_D$). The distance $L_D$ is the distance between the surface of the screen SC and detection light LC in the direction perpendicular to the screen SC. The distance $L_D$ changes depending on the attachment position of the light emission device 60 to the screen SC, and it is structurally difficult to make the distance $L_D$ zero.

As shown in FIG. 7(A), when performing position detection of the indicator 70, infrared light is emitted from a light emission position 70a at the tip of the indicator 70. The light emission position 70a is very close to a contact point 70b where the indicator 70 is in contact with the screen SC. For this reason, if the image of light emitted from the indicator 70 is detected by captured image data imaged by the imaging unit 51, the position of the detected image can be regarded as the position of the contact point 70b.

In contrast, when detecting the indication position of the indicator 80, as shown in FIG. 7(B), reflected light of detection light LC reflected by the indicator 80 is detected. Since detection light LC is separated from the screen SC by the distance $L_D$, as shown in FIGS. 6 and 7(B), a reflection position 80a where detection light LC is reflected is separated from a contact position 80b of the indicator 80 and the surface of the screen SC by the distance $L_D$.

For this reason, in captured image data of the imaging unit 51, the position of reflected light is the same position as light emitted at a point 80c formed by extending an imaging direction PA of the imaging unit 51 to the screen SC. That is, in captured image data, reflected light when the indicator 80 indicates the contact position 80b is detected at the same position as, for example, when the indicator 70 indicates the point 80c.

Accordingly, if the position detection unit 50 detects the indication position of the indicator 80 in the same manner as the indicator 70, when the contact position 80b is indicated, the indication position is detected as the point 80c, and deviation occurs. The deviation is referred to as an error Err.

The error Err is due to separation of detection light LC from the screen SC by the distance $L_D$, the occurrence of the error Err is not limited to the up-down direction, and the same error Err also occurs in a horizontal direction. It is possible to obtain the magnitude of the error Err based on the magnitudes of the distance $L_D$ and the distance L between the imaging unit 51 and the screen SC. In other words, it is possible to obtain the magnitude of the error Err based on the distance L and the distance $L_D$ and to perform correction.

Accordingly, when detecting the indication position of the indicator 80, the projector 10 detects the indication position in the same manner as the indicator 70 and then performs correction of the detected position based on the distance $L_D$.

The distance $L_D$ for use in correction may be a preset value or may be an actually measured value. The projector 10 stores a standard specified value of the distance $L_D$ in the storage unit 110 as initial correction data 125 (distance data). Initial correction data 125 is a specified value which defines the standard value of the distance $L_D$.

At the time of the installation of the light emission device 60, the distance $L_D$ between the screen SC and detection light LC is adjusted to, for example, 10 mm to 1 mm, but actually changes in the surface of the screen SC. Initial correction data 125 is set to, for example, 5 mm as the standard value of the distance $L_D$.

The projector 10 executes the manual calibration of the indicator 80, thereby obtaining the distance $L_D$. The arithmetic processing is executed by the distance arithmetic unit 37 when the calibration control unit 39 executes the manual calibration. The specific content of the arithmetic processing will be described below.

The distance $L_D$ calculated by the manual calibration is stored in the storage unit 110 as manual correction data 126 (distance data). Manual correction data 126 may be in a table format in which the value of the distance $L_D$ is associated with each coordinate on captured image data or each coordinate on the projection image, or may be map data. In addition, manual correction data 126 may be in a table format in which the value of the distance $L_D$ is associated with a preset representative point in the coordinate on the captured image data or the coordinate on the projection image. In the processing for correcting the indication position, when the value of the distance $L_D$ of the coordinate separated from the representative point is required, a method of applying the distance $L_D$ of the representative point close to the coordinate to be corrected or a method of obtaining the distance $L_D$ of the coordinate to be corrected from the distance $L_D$ of the representative point by an interpolation operation may be used. Manual correction data 126 is data which is calculated from the result of the manual calibration, and reflects the real installation state of the screen SC and the light emission device 60. For this reason, if manual correction data 126 is used, it is possible to perform correction reflecting the difference in the surface of the distance $L_D$ and to obtain the indication position of the indicator 80 with higher accuracy.

The storage unit 110 stores, as screen distance data 127, the value of the distance L necessary when the distance arithmetic unit 37 calculates the distance $L_D$. Screen distance data 127 may be preset and stored in the storage unit 110. In this embodiment, the projector 10 includes the distance measurement unit 59 as means for measuring the distance L. When the distance measurement unit 59 measures the distance L under the control of the control unit 30, the measured value is stored as screen distance data 127.

Here, the control unit 30 may set the measured value of the distance measurement unit 59 as screen distance data 127, or may perform arithmetic processing based on the measured value of the distance measurement unit 59 to calculate the distance L and may generate screen distance data 127.

Figure 8A:
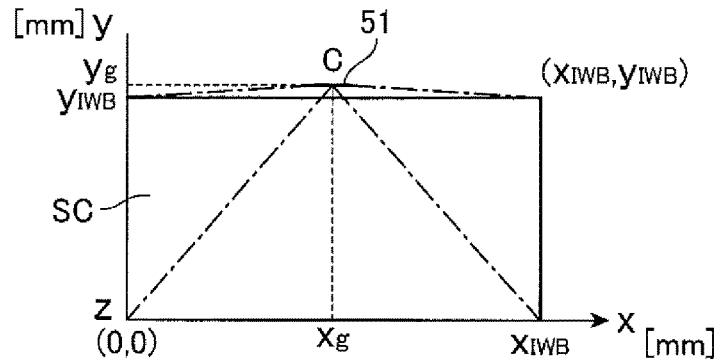
FIG. 8 is an explanatory views of a method of calculating the distance between a screen and detection light.
Figure 8B:
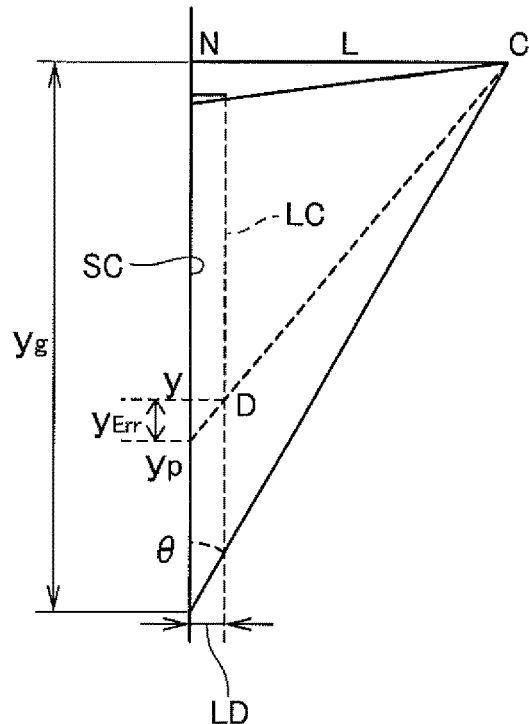
Figure 8C:
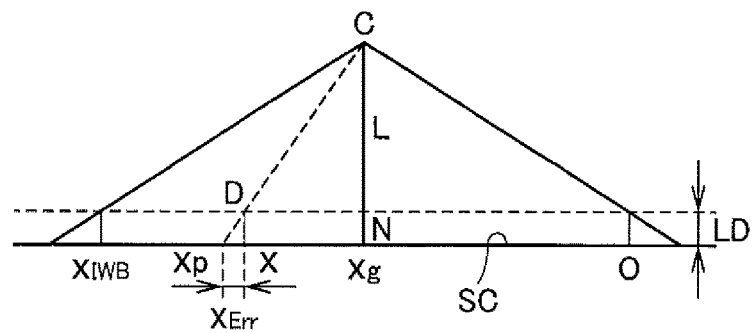

FIG. 8 is an explanatory view illustrating a method of calculating the distance $L_D$ in the distance arithmetic unit 37. FIG. 8(A) is a front view of the screen SC, and FIGS. 8(B) and 8(C) are diagrams schematically showing the positional relationship between the projector 10 and the screen SC. FIG. 8(B) is a diagram when the screen SC is viewed in side view, and FIG. 8(C) is a diagram when the screen SC is viewed from above.

In the following description, as shown in FIG. 8(A), an X-Y orthogonal coordinate system with a lower left corner of the screen SC as an origin Z is set. A horizontal direction from the origin Z is referred to as an X axis, a vertical direction is referred to as a Y axis, and the coordinate of an upper right corner of the screen SC is ($x_{IWB}$, $y_{IWB}$). An operation region of the indicator 70 or 80 is set based on the image angle of the imaging unit 51, the size of the screen SC, or the like.

In this example, it is assumed that the reference position of the imaging unit 51 is the lens of the imaging unit 51, and the lens position is a point C. The X coordinate and Y coordinate of the point C are respectively referred to as $x_g$ and $y_g$. In should be noted that, in the X-axis direction, the lens of the imaging unit 51 is at the center of the screen SC ($x_g$-$x_{IWB}$/2).

In the side view of FIG. 8(B), when detecting the indication position of the indicator 80, the Y coordinate of the indication position on the screen SC indicated by the indicator 80 is referred to as y, and the reflection position where detection light LC is reflected by the indicator 80 is referred to as a point D. In addition, the Y coordinate of the indication position which is obtained when the indication position of the indicator 80 is obtained in the same manner as the indication position of the indicator 70 is referred to as $y_p$. The difference between the Y coordinate $y_p$ and the Y coordinate y is referred to an error $y_{Err}$ in the Y-axis direction. In addition, a point where a line which passes through the point C representing the reference position of the imaging unit 51 and is perpendicular to the screen SC crosses the screen SC in the same plane is referred to as a point N.

In the plan view of FIG. 8(C), when detecting the indication position of the indicator 80, the X coordinate of the indication position on the screen SC indicated by the indicator 80 is referred to as x. The X coordinate of the indication position which is obtained when the indication position of the indicator 80 is obtained in the same manner as the indication position of the indicator 70 is referred to as $x_p$. The difference between the X coordinate $x_p$ and the X coordinate x is referred to as an error $x_{Err}$ in the X-axis direction.

First, the relationship between the error $y_{Err}$ in the Y-axis direction and the distance $L_D$ will be described referring to FIG. 8(B).

In the drawings, a triangle C-N-$y_p$ connecting the point C, the point N, and the coordinate $y_p$ on the Y axis (screen SC) is similar to a triangle D-y-$y_p$ connecting the point D and the coordinates y and $y_p$ on the Y axis (screen SC). Accordingly, the relationship of Expression (1) is established. Expression (1) is modified to obtain Expression (2), and if further modified, Expression (3) for obtaining the value of $L_D$ is obtained.

$$\frac{y - y_p}{L_D} = \frac{y_g - y_p}{L} \qquad (1)$$

$$y - y_p = \frac{L_D(y_g - y_p)}{L} \qquad (2)$$

$$L_D = \frac{(y - y_p) \times L}{y_g - y_p} \quad (3)$$

The error $y_{Err}$ in the Y-axis direction on the screen SC is the difference between the Y coordinates $y_p$ and y, and can be thus obtained based on Expression (2).

In addition, the distance $L_D$ between the surface of the screen SC and detection light LC can be obtained by Expression (3).

Next, the relationship between the error $x_{Err}$ in the X-axis direction and the distance $L_D$ will be described referring to FIG. 8(C).

In FIG. 8(C), a triangle C-N-$x_p$ connecting the point C, the point N, and the coordinate $x_p$ on the X axis (screen SC) is similar to a triangle D-x-$x_p$ connecting the point D and the coordinates x and $x_p$ on the X axis (screen SC). Accordingly, the relationship of Expression (4) is established. Expression (4) is modified to obtain Expression (5), and if further modified, Expression (6) for obtaining the value of $L_D$ is obtained.

The error in the X-axis direction on the screen SC is the difference between the X coordinates x and $x_p$, and can be thus obtained based on Expression (4). Furthermore, $L_D$ can be obtained by Expression (6).

If the manual calibration is executed concerning the operation of the indicator 80, the difference between the indication position of the indicator 70 and the indication position of the indicator 80 is obtained based on automatic calibration data 123 and manual calibration data 124 relating to the indicator 70. The difference corresponds to the error $x_{Err}$ in the X-axis direction and the error $y_{Err}$ in the Y-axis direction.

Accordingly, the distance arithmetic unit 37 can perform arithmetic processing using Expressions (3) and (6) based on the values of the errors $x_{Err}$ and $y_{Err}$ obtained from the result of the manual calibration of the indicator 80 and can calculate the value of the distance $L_D$. According to Expressions (3) and (6), since it is possible to obtain the value of distance $L_D$ corresponding to the y coordinate and the x coordinate, it is possible to easily create map data which defines the value of the distance $L_D$ corresponding to the x coordinate and the y coordinate.

Further, when the projector 10 detects the operation of the indicator 80 in a normal operation described below, the detection control unit 32 performs control such that the position detection unit 50 detects the indication position based on captured image data, automatic calibration data 123, and manual calibration data 124. The detection control unit 32 causes the position detection unit 50 to execute correction of the detected indication position. The position detection unit 50 executes arithmetic processing represented by Expression (2) and (5) based on the distance $L_D$ set in initial correction data 125 or manual correction data 126. With this, the errors in the X-axis direction and the Y-axis direction are obtained. The position detection unit 50 shifts the detected indication position by the amount corresponding to the obtained errors, thereby obtaining the coordinate of the indication position. With this processing, the operation of the indicator 80 is appropriately corrected in consideration of the distance $L_D$, whereby it is possible to detect an accurate indication position.

Figure 9:
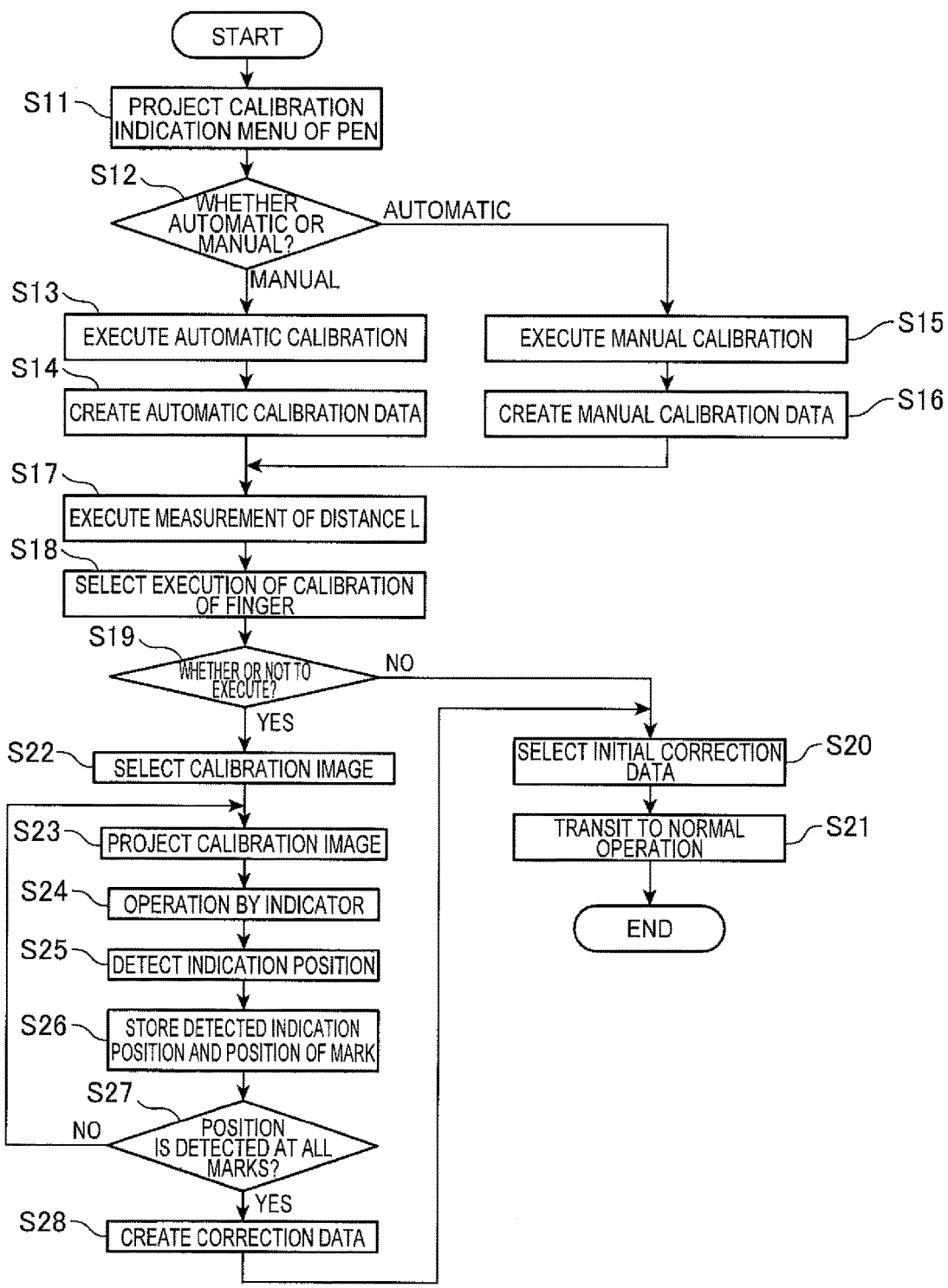
FIG. 9 is a flowchart showing the operation of a projector.

FIG. 9 is a flowchart showing the operation of the projector 10 relating to calibration.

The calibration control unit 39 causes the projection unit 20 to project a menu screen for instructing to execute calibration relating to the indicator 70 by the projection control unit 31 (Step S11). The calibration control unit 39 detects the operation of the remote control or the operation panel 19 (Step S12), when the automatic calibration is selected, progresses to Step S13, and when the manual calibration is selected, progresses to Step S15.

In Step S13, the calibration control unit 39 executes the automatic calibration. The calibration control unit 39 causes the projection control unit 31 and the projection unit 20 to project an image based on the automatic calibration image 121 onto the screen SC. The calibration control unit 39 performs control such that the position detection unit 50 executes imaging, detects the mark of the image on the screen SC from captured image data, and associates the coordinate of the mark on the captured image with the coordinate of the mark on the projection image.

Thereafter, the calibration control unit 39 generates automatic calibration data 123 based on the coordinate of the detected mark and stores the automatic calibration data 123 in the storage unit 110 (Step S14).

In Step S15, the calibration control unit 39 executes the manual calibration relating to the operation of the indicator 70. The calibration control unit 39 causes the projection control unit 31 and the projection unit 20 to project an image based on the manual calibration image 122 onto the screen SC. Here, an operation of the indicator 70 is performed on the screen SC by the user. The calibration control unit 39 performs control such that the position detection unit 50 executes imaging each time the operation of the indicator 70 is performed and detects the indication position of the indicator 70. Then, the detected indication position of the indicator 70 is associated with the coordinate of the mark on the projection image.

Thereafter, the calibration control unit 39 generates manual calibration data 124 based on the detected coordinate and stores the manual calibration data 124 in the storage unit 110 (Step S16).

After calibration data is generated in Step S14 or Step S16, the calibration control unit 39 performs control such that the distance measurement unit 59 measures the distance L and stores the measured value in the storage unit 110 as screen distance data 127 (Step S17).

Next, the calibration control unit 39 causes the projection unit 20 to project a user interface for selecting whether or not to execute the manual calibration relating to the detection of the indication position of the indicator 80 (Step S18). The calibration control unit 39 detects the operation of the remote control or the operation panel 19 and performs determination about whether or not to execute the manual calibration (Step S19).

When it is determined not to execute the manual calibration (Step S19; No), the calibration control unit 39 selects initial correction data 125 (Step S20) and progresses to a normal operation (Step S21). In this case, in the detection of a subsequent indication operation of the indicator 80, a preset standard value of initial correction data 125 is used as the value of the distance $L_D$.

It should be noted that the normal operation is an operation to project an image onto the screen SC based in an input image input to the image I/F unit 12, to specify the indication position indicated by the indicator 70 or 80, and to perform processing according to the indication content.

When performing the manual calibration relating to the operation of the indicator 80 (Step S19; Yes), the calibration control unit 39 selects the manual calibration image 122 (Step S22). Subsequently, the calibration control unit 39 causes the projection unit 20 to project the selected manual calibration image 122 onto the screen SC (Step S23). Here, an operation using the indicator 80 is performed by the user (Step S24). The calibration control unit 39 performs control such that the position detection unit 50 executes imaging by the imaging unit 51 and acquires captured image data of the imaging unit 51 to detect the indication position of the indicator 80 (Step S25). The calibration control unit 39 temporarily stores the coordinate of the indication position in captured image data in the storage unit 110 in association with the position of the mark of the manual calibration image 122 projected in Step S19 (Step S26).

The calibration control unit 39 performs determination about whether or not the indication position is detected for all marks of the manual calibration image 122 (Step S27), and when there is an unprocessed mark, returns to Step S23. When the indication position is detected for all marks, the calibration control unit 39 creates manual correction data 126 based on the coordinate of the indication position and the position of the mark temporarily stored in Step S26 (Step S28). Created manual correction data 126 is stored in the storage unit 110. Thereafter, the calibration control unit 39 progresses to Step S21 and starts the normal operation.

It should be noted that the calibration control unit 39 may generate manual calibration data 124 including the same data as automatic calibration data 123 by the manual calibration of the indicator 70. In this case, the calibration control unit 39 generates the same manual calibration data 124 as automatic calibration data 123 by the processing of Steps S15 to S16 of FIG. 9. Automatic calibration data 123 may be the same data as manual calibration data 124, and in this case, automatic calibration data 123 previously generated is overwritten by data created in Step S16.

In this configuration, if the calibration control unit 39 executes either the automatic calibration or the manual calibration, it is possible to obtain the coordinate of the indication position of the indicator 70. Accordingly, in the operation of FIG. 9, it is possible to select the manual calibration in Step S12 in a state in which automatic calibration data 123 is not stored.

As described above, the projector 10 according to the embodiment to which the invention is applied includes the imaging unit 51 which images the screen SC, and the position detection unit 50 which detects the indication position of the indicator 80 based on the captured image of the imaging unit 51. The position detection unit 50 detects reflected light of detection light reflected by the indicator 80 from the captured image of the imaging unit 51 and obtains the indication position of the indicator 80 based on the position of reflected light detected from the captured image and the distance L between the screen SC and the imaging unit 51. For this reason, it is possible to correct and obtain the indication position detected from the captured image based on the positional relationship between the imaging unit 51 and the screen SC. With this, for example, even when the position detected by the captured image does not match the indication position of the indicator 80 by the positional relationship between the reflection position of detection light in the indicator 80 and the screen SC, it is possible to more accurately detect the indication position of the indicator 80 on the screen SC.

In addition, in the projector 10, the distance arithmetic unit 37 obtains the distance between the screen SC and the reflection position of the indicator 80 in the direction perpendicular to the screen SC based on the distance between the screen SC and the reference position of the imaging unit 51 in the direction perpendicular to the screen SC. With this, it is possible to obtain the indication position on the screen SC indicated by the indicator 80 based on reflected light reflected at the position separated from the screen SC by the distance $L_D$.

Further, the storage unit 110 stores manual correction data 126 representing the distance between the screen SC and the reflection position of the indicator 80 in the direction perpendicular to the screen SC obtained by the distance arithmetic unit 37. The position detection unit 50 obtains the indication position of the indicator 80 based on manual correction data 126 stored in the storage unit 110. With this, the use of manual correction data 126 stored in the storage unit 110 eliminates a need for obtaining the distance $L_D$ each time position detection is performed and allows the indication position on the screen SC to be detected quickly.

In addition, the projector 10 includes the projection unit 20 which projects an image onto the screen SC, and the projection range of the projection unit is imaged by the imaging unit 51, whereby it is possible to detect the indication position corresponding to an operation on the screen SC onto which the image is projected.

Moreover, the projector 10 includes the calibration control unit 39 which executes calibration to associate the position in the captured image of the imaging unit 51 with the position in the image projected by the projection unit 20. The distance arithmetic unit 37 generates manual correction data 126 based on the result of the calibration executed by the calibration control unit 39. With this, it is possible to generate manual correction data 126 by executing the calibration. For this reason, after the calibration is executed, it is possible to accurately detect the indication position and to obtain the detected indication position as the position in the projection image.

Further, the projector 10 includes the distance measurement unit 59 which obtains the distance L between the screen SC and the reference position of the imaging unit 51 in the direction perpendicular to the screen SC, whereby it is possible to more accurately obtain the indication position.

Furthermore, since the light emission device 60 which emits detection light along the screen SC is provided, detection light is emitted, and detection light is reflected by the indicator 80, whereby it is possible to detect the indication position of the indicator 80 with no light emission function or the like.

It should be noted that the above-described embodiment and the modification examples are merely an example of a specific form to which the invention is applied, and is not intended to limit the invention, and the invention may be applied in different forms. In the above-described embodiment, although a case where the distance $L_D$ is obtained by the manual calibration relating to the detection of the indication position of the indicator 80 has been described, the invention is not limited thereto. For example, after the screen SC and the projector 10 are installed, the distance $L_D$ may be measured at a plurality of positions in the surface of the operation region of the screen SC, and measured data may be stored in the storage unit 110 in a map format or a table format. Similarly to manual correction data 126, data can be used as data representing the value of the distance $L_D$ based on an actual direct or indirect measurement. In addition, an indicator is not limited to the pen-type indicator 70 or the indicator 80 which is the finger of the user, a laser pointer, an indicator rod, or the like may be used, and the shape or size thereof is not limited. Further, a method of detecting the indication position of the indicator is not limited to the example of the above-described embodiment, and a ray, such as a visible ray or an ultraviolet ray, may be used, or an ultrasonic wave, a radio wave, or the like may be used.

In addition, in the above-described embodiment, although a configuration in which the signal for synchronization is transmitted from the projector 10 to the indicator 70 using the infrared signal emitted from the transmission unit 52 has been described, the signal for synchronization is not limited to the infrared signal. For example, a configuration may be made in which the signal for synchronization is transmitted by radio wave communication or ultrasonic radio communication. This configuration can be realized by providing the projector 10 with a transmission unit which transmits a signal by radio communication or ultrasonic radio communication and by providing the indicator 70 with a similar reception unit.

In addition, in the above-described embodiment, although the position detection unit 50 images the screen SC by the imaging unit 51 to specify the position of the indicator 70, the invention is not limited thereto. For example, the imaging unit 51 is not limited to an imaging unit which is provided in the main body of the projector 10 and images the projection direction of the projection optical system 23. The imaging unit 51 may be provided as a separate body from the main body of the projector 10, or the imaging unit 51 may perform imaging from the side or the front of the screen SC. A plurality of imaging units 51 may be arranged, and the detection control unit 32 detects the position of the indicator 70 or 80 based on captured image data of a plurality of imaging units 51.

Further, in the above-described embodiment, although a case where the position detection unit 50 executes arithmetic processing for correcting the indication position detected from captured image data based on initial correction data 125 or manual correction data 126 has been described, the control unit 30 may perform arithmetic processing.

In the above-described embodiment, although a configuration in which three transmissive liquid crystal panels corresponding to the respective colors of RGB are used as the optical modulation device 22 which modulates light emitted from the light source has been described as an example, the invention is not limited thereto. For example, three reflective liquid crystal panels may be used, or a system using one liquid crystal panel and a color wheel in combination may be used. Alternatively, a system using three digital mirror devices (DMD), a DMD system in which one digital mirror device and a color wheel are combined, or the like may be used. When only one liquid crystal panel or a DMD is used as the optical modulation device, a member corresponding to a synthesis optical system, such as a cross dichroic prism, is not required. In addition, other than the liquid crystal panel and the DMD, any optical modulation device may be used without problems insofar as light emitted from the light source can be modulated. In the above-described embodiment, although a form in which the user performs an indication operation by the indicator 70 or 80 on the screen SC (projection surface, display surface) onto which a front projection-type projector 10 projects (displays) an image has been described, a form in which the user performs an indication operation on a display screen (display surface) on which a display device (display unit) other than the projector 10 displays an image may be made. In this case, the light emission device 60 or the imaging unit 51 may be constituted integrally with the display device or may be constituted as a separate body from the display device. As the display device other than the projector 10, a rear projection-type projector, a liquid crystal display, an organic electro luminescence (EL) display, a plasma display, a cathode ray tube (CRT) display, a surface-conduction electron-emitter display (SED), or the like may be used.

Further, the respective functional units of the projection system 1 shown in FIG. 2 show functional configurations, and the specific mounting form is not particularly limited. That is, it may be not necessary that hardware individually corresponding to the respective functional units is mounted, and of course, one processor may execute programs to realize the functions of a plurality of functional units. Further, some of the functions realized by software in the above-described embodiment may be realized by hardware or some of the functions realized by hardware may be realized by software. In addition, specific detailed configurations of other respective units of the projection system 1 may be arbitrarily changed without departing from the scope of the invention.

REFERENCE SIGNS LIST

1: projection system (position detection system)
10: projector (position detection device)
20: projection unit
21: light source unit
22: optical modulation device
23: projection optical system
30: control unit
31: projection control unit
32: detection control unit
33: emission control unit
37: distance arithmetic unit (arithmetic unit)
39: calibration control unit
40: image processing unit
50: position detection unit (detection unit)
51: imaging unit
59: distance measurement unit
60: light emission device (light emission unit)
70, 80: indicator
110: storage unit
122: manual calibration image
125: initial correction data
126: manual correction data (distance data)
SC: screen (operation surface)

The invention claimed is:

1. A position detection device comprising:
an imaging unit which images an operation surface; and
a detection unit which detects an indication position of an indicator on the operation surface based on a captured image of the imaging unit,
wherein the detection unit detects reflected light of detection light reflected by the indicator from the captured image of the imaging unit, and obtains the indication position of the indicator on the operation surface spaced from a point on the operation surface formed by linearly extending an imaging direction of the imaging unit to the operation surface by correcting the point on the operation surface based on the position of the reflected light detected from the captured image, a distance between the operation surface and the imaging unit in a direction perpendicular to the operation surface, and a distance between the operation surface and a reflection position of the indicator in the direction perpendicular to the operation surface.

2. The position detection device according to claim 1, further comprising:
an arithmetic unit which obtains the distance between the operation surface and the reflection position of the indicator in the direction perpendicular to the operation surface based on the distance between the operation surface and a reference position of the imaging unit in the direction perpendicular to the operation surface.

3. The position detection device according to claim 2, further comprising:
a storage unit which stores distance data representing the distance between the operation surface and the reflection position of the indicator in the direction perpendicular to the operation surface obtained by the arithmetic unit,
wherein the detection unit obtains the indication position of the indicator based on the distance data stored in the storage unit.

4. The position detection device according to claim 3,
wherein the position detection device is configured as a projector including a projection unit which projects an image onto the operation surface, and
the projection range of the projection unit is imaged by the imaging unit.

5. The position detection device according to claim 4, further comprising:
a calibration control unit which executes calibration to associate the position in the captured image of the imaging unit with the position in an image projected by the projection unit,
wherein the arithmetic unit generates the distance data based on the result of the calibration executed by the calibration control unit.

6. The position detection device according to claim 2, further comprising:
a distance measurement unit which obtains the distance between the operation surface and the reference position of the imaging unit in the direction perpendicular to the operation surface.

7. The position detection device according to claim 1, further comprising:
a light emission unit which emits detection light along the operation surface.

8. The position detection device according to claim 1, wherein the operation surface is a hard surface.

9. The position detection device according to claim 1, wherein the reflection position of the indicator is spaced from the operation surface.

10. A position detection system comprising:
a light emission device which emits detection light along an operation surface to be operated by an indicator; and
a position detection device which detects an indication position of the indicator,
wherein the position detection device includes
an imaging unit which images the operation surface, and
a detection unit which detects the indication position of the indicator on the operation surface based on a captured image of the imaging unit, and
the detection unit detects reflected light of detection light reflected by the indicator from the captured image of the imaging unit, and obtains the indication position of the indicator on the operation surface spaced from a point on the operation surface formed by linearly extending an imaging direction of the imaging unit to the operation surface by correcting the point on the operation surface based on the position of the reflected light detected from the captured image, a distance between the operation surface and the imaging unit in a direction perpendicular to the operation surface, and a distance between the operation surface and a reflection position of the indicator in the direction perpendicular to the operation surface.

11. A position detection method which detects a position indicated by an indicator on an operation surface, the method comprising:
imaging the operation surface; and
detecting reflected light of detection light reflected by the indicator from a captured image and obtaining the indication position of the indicator on the operation surface spaced from a point on the operation surface formed by linearly extending an imaging direction of an imaging unit to the operation surface by correcting the point on the operation surface based on the position of the reflected light detected from the captured image, a distance between the operation surface and an imaging position in a direction perpendicular to the operation surface, and a distance between the operation surface and a reflection position of the indicator in the direction perpendicular to the operation surface.

* * * * *